(12) United States Patent
Hashiwata

(10) Patent No.: US 11,043,777 B2
(45) Date of Patent: Jun. 22, 2021

(54) HARD-TO-DEFORM CARD TRAY AND ELECTRONIC DEVICE

(71) Applicant: SHARP KABUSHIKI KAISHA, Sakai (JP)

(72) Inventor: Yoshio Hashiwata, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 73 days.

(21) Appl. No.: 16/515,876

(22) Filed: Jul. 18, 2019

(65) Prior Publication Data

US 2020/0052447 A1 Feb. 13, 2020

(30) Foreign Application Priority Data

Aug. 7, 2018 (JP) .............................. JP2018-148603

(51) Int. Cl.
*H01R 24/00* (2011.01)
*H01R 27/02* (2006.01)
*G06K 13/08* (2006.01)
*H01R 12/73* (2011.01)

(52) U.S. Cl.
CPC ............ *H01R 27/02* (2013.01); *G06K 13/08* (2013.01); *H01R 12/73* (2013.01)

(58) Field of Classification Search
CPC ...... H01R 12/721; H01R 27/00; H01R 27/02; G06K 13/08; G06K 7/10237
USPC ................................................. 439/630, 159
See application file for complete search history.

(56) References Cited

U.S. PATENT DOCUMENTS

| | | | | |
|---|---|---|---|---|
| 9,652,639 B2* | 5/2017 | Motohashi | ........... | H01R 13/629 |
| 9,652,697 B2* | 5/2017 | Nagase | ................... | G06K 13/08 |
| 9,680,243 B2* | 6/2017 | Shimotsu | ............... | G06K 13/08 |
| 9,761,971 B2* | 9/2017 | Motohashi | ........... | H04B 1/3816 |
| 9,875,432 B2* | 1/2018 | Motohashi | ........... | G06K 7/0021 |
| 2012/0276780 A1* | 11/2012 | Hu | ....................... | H01R 13/641 439/630 |
| 2016/0028172 A1* | 1/2016 | Motohashi | ......... | H01R 13/7031 439/160 |
| 2016/0036143 A1* | 2/2016 | Motohashi | ............. | G06K 13/08 439/160 |
| 2016/0111802 A1* | 4/2016 | Shimotsu | ............. | H01R 13/633 439/159 |
| 2016/0164205 A1* | 6/2016 | Nagase | ................... | G06K 13/08 439/159 |
| 2016/0227661 A1 | 8/2016 | Yang et al. | | |
| 2016/0248184 A1* | 8/2016 | Motohashi | ............. | G06K 13/08 |
| 2016/0359269 A1* | 12/2016 | Motohashi | ............. | G06K 13/08 |

FOREIGN PATENT DOCUMENTS

| | | |
|---|---|---|
| CN | 105846234 A | 8/2016 |
| JP | 2016-025018 A | 2/2016 |

* cited by examiner

*Primary Examiner* — Hae Moon Hyeon
(74) *Attorney, Agent, or Firm* — ScienBiziP, P.C.

(57) ABSTRACT

A frame-shaped tray body section of a card tray includes: a first extension connected to a lid section; and a second extension opposing the first extension. The second extension has an outer face thereof being composed of a metal material, the outer face being opposite from an inner face of the second extension where the second extension opposes the first extension.

8 Claims, 7 Drawing Sheets

HARD-TO-DEFORM CARD TRAY AND ELECTRONIC DEVICE

FIELD OF THE INVENTION

The present invention relates to card trays and electronic devices.

BACKGROUND OF THE INVENTION

To install a memory card in the housing of an electronic device such as a mobile phone, a card tray is used for carrying the memory card therein. As described in Patent Literature 1, a memory card is placed in a frame-shaped tray body section in a card tray for installation in the housing of an electronic device. To remove the card tray from the housing of the electronic device, the frame-shaped tray body section is pushed out in a removal direction using a push-out lever disposed behind the frame-shaped tray body section. The card tray and the memory card are thus removed from the housing of the electronic device.

CITATION LIST

Patent Literature

Patent Literature 1: Japanese Unexamined Patent Application Publication, Tokukai, No. 2016-25018 (Publication Date: Feb. 8, 2016)

SUMMARY OF THE INVENTION

Problems to be Solved by the Invention

In the card tray described in Patent Literature 1, however, the frame-shaped tray body section is entirely composed of a resin material. The frame-shaped tray body section is therefore not sufficiently stiff, hence disadvantageously susceptible to deformation, in a face thereof that receives force from the push-out lever. The present invention, in an aspect thereof, has an object to provide a hard-to-deform card tray and an electronic device including such a card tray.

Solution to the Problem

To address the problem, the present invention, in an aspect thereof, is directed to a card tray for holding therein a card to be inserted into a housing of an electronic device, the card tray including: a lid section serving as a flange in inserting the card into the housing; and a frame-shaped tray body section into which the card is fitted, the tray body section being connected to the lid section, wherein the tray body section includes: a first extension connected to the lid section; and a second extension opposing the first extension, and the second extension has at least an outer face thereof being composed of a metal material, the outer face being opposite from an inner face of the second extension where the second extension opposes the first extension.

Advantageous Effects of the Invention

The present invention, in an aspect thereof, can provide a hard-to-deform card tray.

DESCRIPTION OF EMBODIMENTS

Embodiment 1

Figure 1:
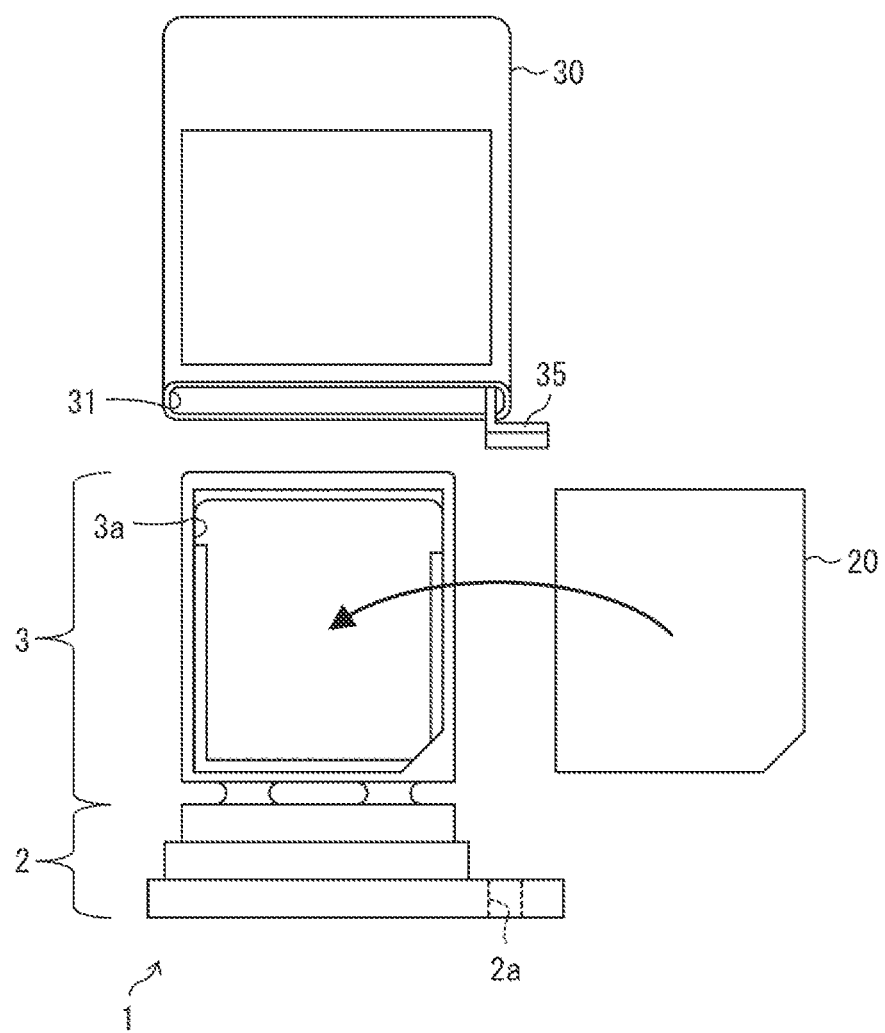
FIG. 1 is an illustration of a card tray in accordance with Embodiment 1 holding a card therein before being inserted into a card cover slot.

FIG. 1 is an illustration of a card tray 1 holding a card 20 therein before being inserted into a card cover slot 30. The card 20 may be any kind of card that can be inserted into, and removed from, the housing of an electronic device. Examples of the card 20 include various memory cards and SIM (subscriber identity module) cards. The card 20 has terminals. When the card 20 is inserted in the housing of an electronic device, the terminals come into contact with terminals on a substrate in the housing of the electronic device either directly or via the card cover slot 30. The card 20 is thus electrically connected to the substrate in the housing of the electronic device. Examples of the electronic device where the card 20 is inserted into the housing thereof include various electronic devices such as mobile phones, smartphones, and laptop computers.

The card tray 1 is a tray for holding the card 20 therein. The card tray 1 enables the card 20 placed therein to be inserted into, and removed from, the housing of the electronic device. The card tray 1 includes a lid section 2 and a tray body section 3. The lid section 2 serves as a flange and also as a lid for the housing when the card tray 1 is inserted into the housing of the electronic device. The lid section 2 has a through hole 2a formed therein. The tray body section 3 is connected to the lid section 2 and shaped like a frame. The card 20 is mounted in the tray body section 3 by being fitted into the tray body section 3. The tray body section 3 has an opening 3a in a face opposing a bottom face of the card 20. The tray body section 3 is shaped like a frame around the opening 3a.

The card tray 1 holding the card 20 therein can be inserted into, and ejected from, the card cover slot 30. The card cover slot 30 is shaped like a box so that the card tray 1 holding the card 20 therein can be inserted into the card cover slot 30 and removed from the card cover slot 30. The card cover slot 30 may be composed of, for example, stainless steel. The card cover slot 30 may be provided in the housing of the electronic device in advance before the card tray 1 is inserted and may be placed in the housing of the electronic device after the card tray 1 is inserted.

The card cover slot 30 has one of the faces thereof forming an insertion opening 31 through which the card tray 1 holding the card 20 therein can be inserted. The card cover slot 30 further includes an operation section 35. The operation section 35 is a bar-shaped member operated by the user to eject the card tray 1 that resides in the card cover slot 30 out of the card cover slot 30. In the following description, the end of the card cover slot 30 on which the insertion opening 31 is formed may be referred to as the front, whereas the end of the card cover slot 30 opposite from the end on which the insertion opening 31 is formed may be referred to as the back or rear.

Figure 2:
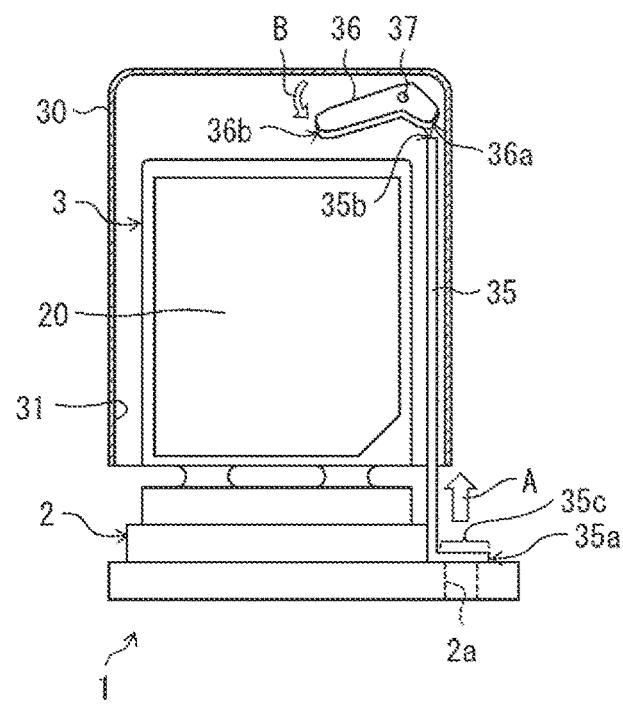
FIG. 2 is a cross-sectional view of a card cover slot into which a card tray in accordance with Embodiment 1 is inserted.

FIG. 2 is a cross-sectional view of the card cover slot 30 into which the card tray 1 in accordance with Embodiment 1 is inserted. The card cover slot 30 includes an eject lever 36 in addition to the operation section 35. The eject lever 36 is disposed inside the card cover slot 30 on the back side of the card tray 1 residing in the card cover slot 30. The eject lever 36 is disposed on the bottom face of the card cover slot 30 such that the eject lever 36 can pivot around a shaft 37.

The operation section 35 is disposed in the card cover slot 30 in such a manner that the operation section 35 can slide in the direction in which the card tray 1 is inserted into, and ejected from, the card cover slot 30. The operation section 35 extends through the insertion opening 31 from the outside to the inside of the card cover slot 30 along one of the inner side faces of the card cover slot 30. The operation section 35 has a bent portion 35c near an end 35a thereof located outside the card cover slot 30. The operation section 35 has another end 35b thereof located inside the card cover slot 30 near the eject lever 36.

As the card tray 1 holding the card 20 therein is slid through the insertion opening 31 and into the card cover slot 30 in the insertion direction (indicated by arrow A), the lid section 2 comes into contact with, and presses, the bent portion 35c. Accordingly, the operation section 35 is also slid in the insertion direction. Upon the card tray 1 reaching a prescribed position inside the card cover slot 30, the card tray 1 and the operation section 35 stop sliding, which completes the insertion of the card tray 1 in the prescribed position inside the card cover slot 30. In this condition, the eject lever 36 is located behind the card tray 1 and the operation section 35 in the back of the card cover slot 30, and the eject lever 36 is separated from the other end 35b of the operation section 35. Additionally, the through hole 2a in the lid section 2 overlies the bent portion 35c of the operation section 35.

To eject the card tray 1 from the card cover slot 30, the user presses the bent portion 35c of the operation section 35 by passing through the through hole 2a an eject pin that has such an outer diameter that the eject pin can pass through the through hole 2a. This action of the user slides the operation section 35 further in the insertion direction (indicated by arrow A), which causes the other end 35b to press one of the ends (end 36a) of the eject lever 36. The eject lever 36 therefore pivots around the shaft 37 in the direction indicated by arrow B, and an end 36b of the eject lever 36 opposite from the end 36a presses the rear side face of the tray body section 3 of the card tray 1. The card tray 1 hence slides in the card cover slot 30 in the ejection direction (i.e., in the opposite direction from the direction indicated by arrow A in FIG. 2). The card tray 1 is thus ejected from the card cover slot 30.

Figure 3:
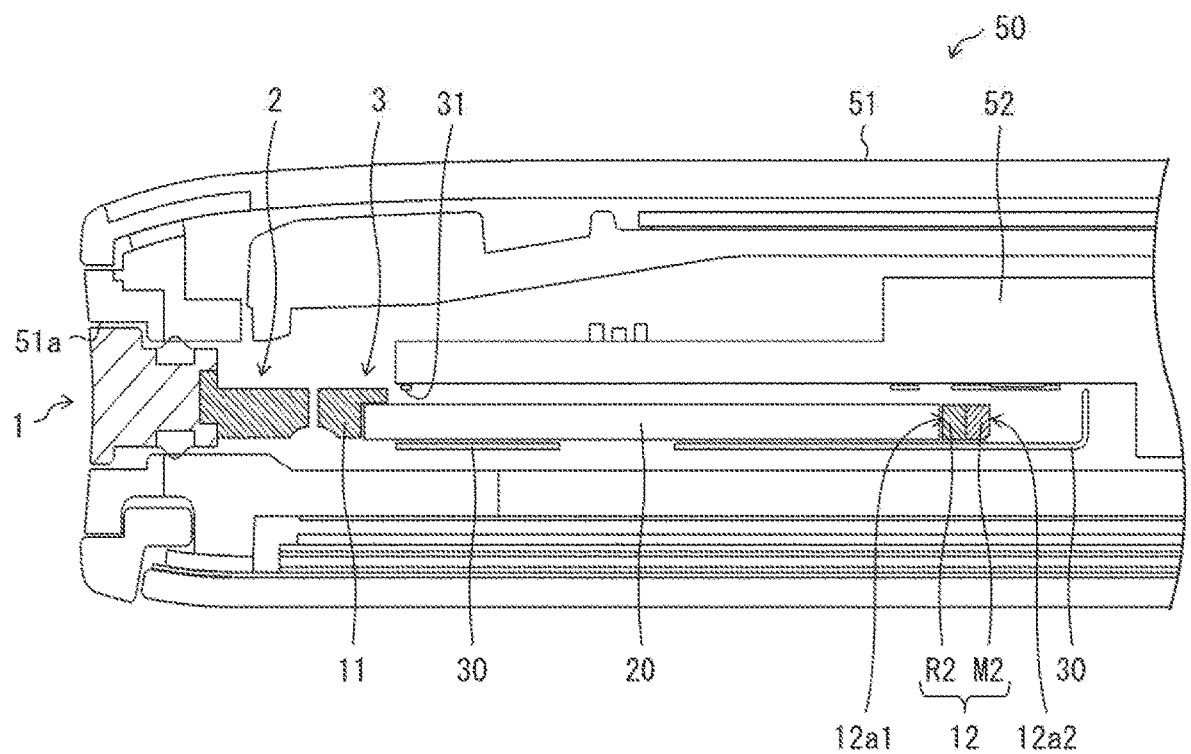
FIG. 3 is a cross-sectional view of an electronic device into which a card tray in accordance with Embodiment 1 is inserted.

FIG. 3 is a cross-sectional view of an electronic device 50 into which the card tray 1 in accordance with Embodiment 1 is inserted. FIG. 3 shows, as an example, that a substrate 52, having the card cover slot 30 on the backside thereof, is contained in a housing 51 of the electronic device 50. The card tray 1 holding the card 20 therein is inserted into the housing 51 through an insertion opening 51a formed in a side face of the housing 51, reaching a prescribed position inside the card cover slot 30. Hence, the terminals of the card 20 come into contact with terminals on the substrate 52 either directly or via the card cover slot 30. In addition, the lid section 2 serves as a flange when coming into contact with an inner side face of the insertion opening 51a of the housing 51. The lid section 2 also serves as a lid of the insertion opening 51a by fitting into the insertion opening 51a. The lid section 2 may further serve to keep the housing 51 sealed and prevent water from seeping into the housing 51, which ensures water resistance of the housing 51.

Figure 4:
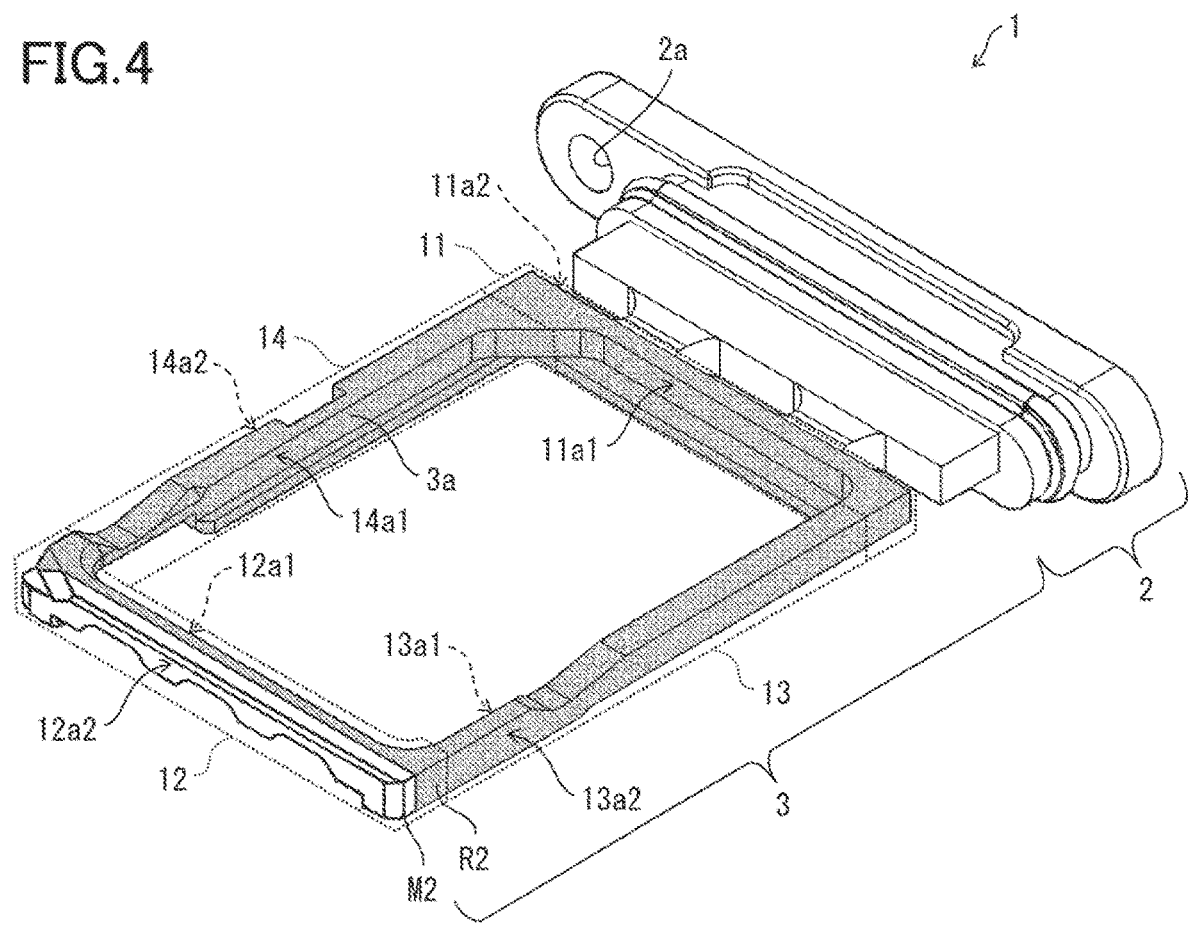
FIG. 4 is a perspective view of a structure of a card tray in accordance with Embodiment 1.

FIG. 4 is a perspective view of a structure of the card tray 1 in accordance with Embodiment 1. The tray body section 3 includes a first extension 11 connected to the lid section 2, a second extension 12 opposing the first extension 11, a third extension 13 connecting an end of the first extension 11 to an end of the second extension 12, and a fourth extension 14 connecting the other end of the first extension 11 to the other end of the second extension 12. The third extension 13 connects an end of the first extension 11 to an end of the second extension 12 that is on the same side as that end of the first extension 11. The fourth extension 14 connects the other end of the first extension 11 to the other end of the second extension 12 that is on the same side as the other end of the first extension 11.

The tray body section 3 hence includes the third extension 13 and the fourth extension 14 opposing the third extension 13, as well as the first extension 11 and the second extension 12. Connecting an end of each of the first extension 11, the second extension 12, the third extension 13, and the fourth extension 14 to the other end of another extension gives a frame-like shape to the tray body section 3. In other words, the opening 3a is surrounded by the first extension 11, the second extension 12, the third extension 13, and the fourth extension 14.

The first extension 11 has an inner face 11a1 facing the second extension 12 and an outer face 11a2 facing away from the second extension 12. The second extension 12 has an inner face 12a1 facing the first extension 11 and an outer face 12a2 facing away from the first extension 11. The third extension 13 has an inner face 13a1 facing the fourth extension 14 and an outer face 13a2 facing away from the fourth extension 14. The fourth extension 14 has an inner face 14a1 facing the third extension 13 and an outer face 14a2 facing away from the third extension 13. The outer face 11a2 of the first extension 11 is connected to the lid section 2.

In the tray body section 3 structured as described above, it is the outer face 12a2 of the second extension 12 that is pressed by the eject lever 36 in ejecting the card tray 1 from the housing 51. In view of this situation, at least the outer face 12a2 of the second extension 12 is composed of a metal material in the present embodiment. This structure gives additional stiffness to the outer face 12a2 of the second extension 12 when compared with a structure where the outer face 12a2 of the second extension 12 is composed of a resin material. The extra stiffness can prevent the tray body section 3 from being deformed when the outer face 12a2 of the second extension 12 is pressed by the eject lever 36 in ejecting the card tray 1 from the housing 51. The card tray 1 hence has high stiffness and is hard to deform. Examples of the metal material for the outer face 12a2 of the second extension include aluminum, stainless steel, magnesium, and titanium.

Specifically, as shown in FIGS. 3 and 4, the second extension 12 includes a resin extension R2 and a metal extension M2 that are adjacent to each other. The resin extension R2 is composed of a resin material. The metal extension M2 is composed of a metal material. The inclusion of the metal extension M2 in the second extension 12 gives high stiffness to the card tray 1.

In other words, the second extension 12 has the inner face 12a1 thereof provided by the resin extension R2 and the outer face 12a2 thereof provided by the metal extension M2. The inner face 12a1 of the second extension 12 is hence provided by the resin extension R2 which has higher elasticity than the metal material. The tray body section 3 can therefore easily follow the displacement that may occur in inserting the card tray 1 into the housing 51, thereby better maintaining the water resistance of the housing 51. The resultant card tray 1 has high stiffness and maintains the water resistance of the housing 51. The resin extension R2 and the metal extension M2, which are adjacent to each other, are arranged parallel to each other in the second extension 12 as detailed above. The resin extension R2 and the metal extension M2 have the same thickness in the present embodiment.

Both the third extension 13 and the fourth extension 14 are composed of a resin material that has higher elasticity than the metal material as shown in FIG. 4. The resultant card tray 1 has high stiffness and maintains the water resistance of the housing 51. The first extension 11 is also composed of a resin material in the present embodiment. The card tray 1 hence has higher elasticity and better maintains the water resistance of the housing 51. Put differently, the inner face 11a1 and the outer face 11a2 of the first extension 11, the inner face 13a1 and the outer face 13a2 of the third extension 13, and the inner face 14a1 and the outer face 14a2 of the fourth extension 14 are all composed of a resin material.

Put further differently, the first extension 11, the resin extension R2 including the inner face 12a1 of the second extension 12, the third extension 13, and the fourth extension 14 surround the opening 3a like a frame. In other words, the portion of the tray body section 3 that comes into contact with the card 20 is formed of a high-elasticity resin material and shaped like a frame. The resultant card tray 1 has high stiffness and maintains the water resistance of the housing 51.

The first extension 11, the resin extension R2 of the second extension 12, the third extension 13, and the fourth extension 14 may be formed integrally of a resin material. Furthermore, the first extension 11, the resin extension R2 of the second extension 12, the third extension 13, and the fourth extension 14 may be formed integrally with the metal extension M2 of the second extension 12 by injection molding of a resin material and a metal material.

The surface of the metal extension M2 (where the metal extension M2 contacts the resin extension R2) may be subjected to special processing to improve adhesion between the metal extension M2 and the resin extension R2. Additionally, a hole may be formed in a part of the metal extension M2 in injection molding so that a resin material can be poured into the hole for an anchoring effect, to improve adhesion between the metal extension M2 and the resin extension R2.

Embodiment 2

Figure 5:
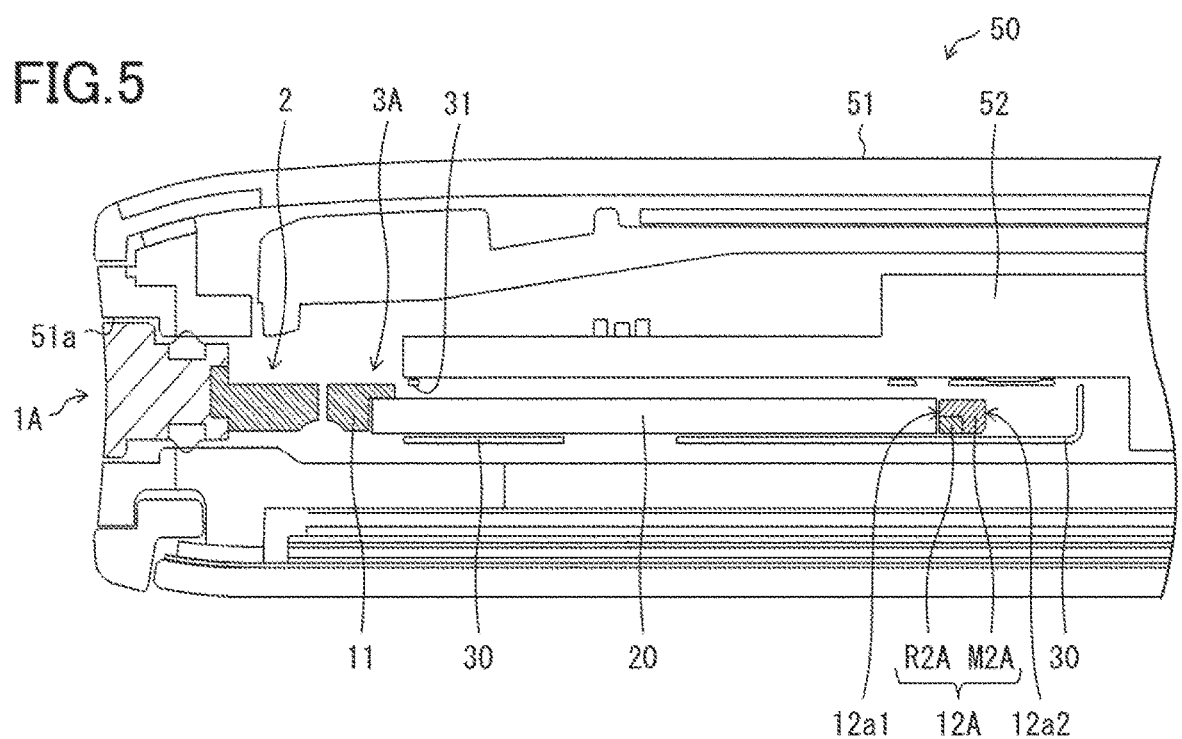
FIG. 5 is a cross-sectional view of an electronic device into which a card tray in accordance with Embodiment 2 is inserted.

The following will describe Embodiment 2 of the present invention. For convenience of description, members of the present embodiment that have the same function as members shown in drawings for Embodiment 1 are indicated by the same reference numerals, and description thereof is omitted. FIG. 5 is a cross-sectional view of an electronic device 50 into which a card tray 1A in accordance with Embodiment 2 is inserted. The card tray 1A includes a tray body section 3A in place of the tray body section 3 of the card tray 1 (FIG. 4). The tray body section 3A includes a second extension 12A in place of the second extension 12 of the tray body section 3. The card tray 1A has otherwise the same structure as the card tray 1.

In the card tray 1A, the second extension 12A has an inner face 12a1 provided by a combination of a resin extension R2A and a metal extension M2A and an outer face 12a2 provided by the metal extension M2A. The resin extension R2A is thinner than the metal extension M2A in the present embodiment such that the resin extension R2A has two surfaces thereof in contact with the metal extension M2A, which improves adhesion between the resin extension R2A and the metal extension M2A. The resultant card tray 1A has high stiffness.

The same description applies to the embodiments and examples given below if the first to fourth extensions each include both a resin extension and a metal extension. The resin extension may be thinner than the metal extension such that the resin extension has two surfaces thereof in contact with the metal extension, which improves adhesion between the resin extension and the metal extension.

Embodiment 3

The following will describe Embodiment 3 of the present invention. For convenience of description, members of the present embodiment that have the same function as members shown in drawings for Embodiments 1 and 2 are indicated by the same reference numerals, and description thereof is omitted. Metal and resin extensions may be combined in various manners in the tray body section, which allows for adjustment of balance between the stiffness and flexibility of the tray body section.

Figure 6:
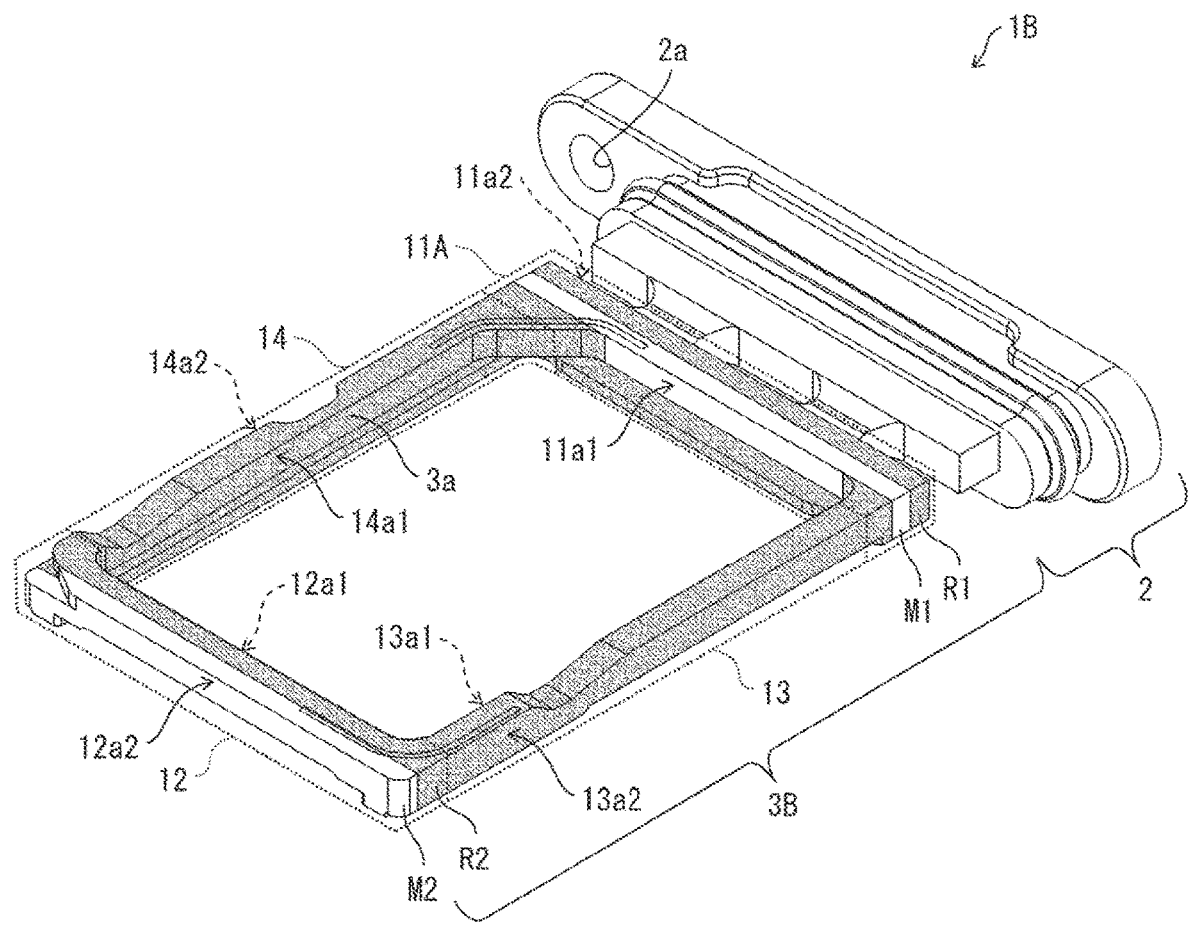
FIG. 6 is a perspective view of a structure of a card tray in accordance with Embodiment 3.

FIG. 6 is a perspective view of a structure of a card tray 1B in accordance with Embodiment 3. The card tray 1B includes a tray body section 3B in place of the tray body section 3 of the card tray 1 (FIG. 4). The tray body section 3B includes a first extension 11A in place of the first extension 11 of the tray body section 3. The card tray 19 has otherwise the same structure as the card tray 1.

The first extension 11A has an inner face 11a1 provided by a metal extension M1 and an outer face 11a2 provided by a resin extension R2. The first extension 11A includes a resin extension R1 and the metal extension M1, which are adjacent to each other. The resin extension R1 and the metal extension M1 have the same thickness. The tray body section 3B may be described, in this manner, as having sides that come into contact with the card 20, one of which is composed of a metal material and the others of which are composed of a resin material. The resultant tray body section 3B has a higher metal material content, hence higher stiffness, than the tray body section 3.

Figure 7:
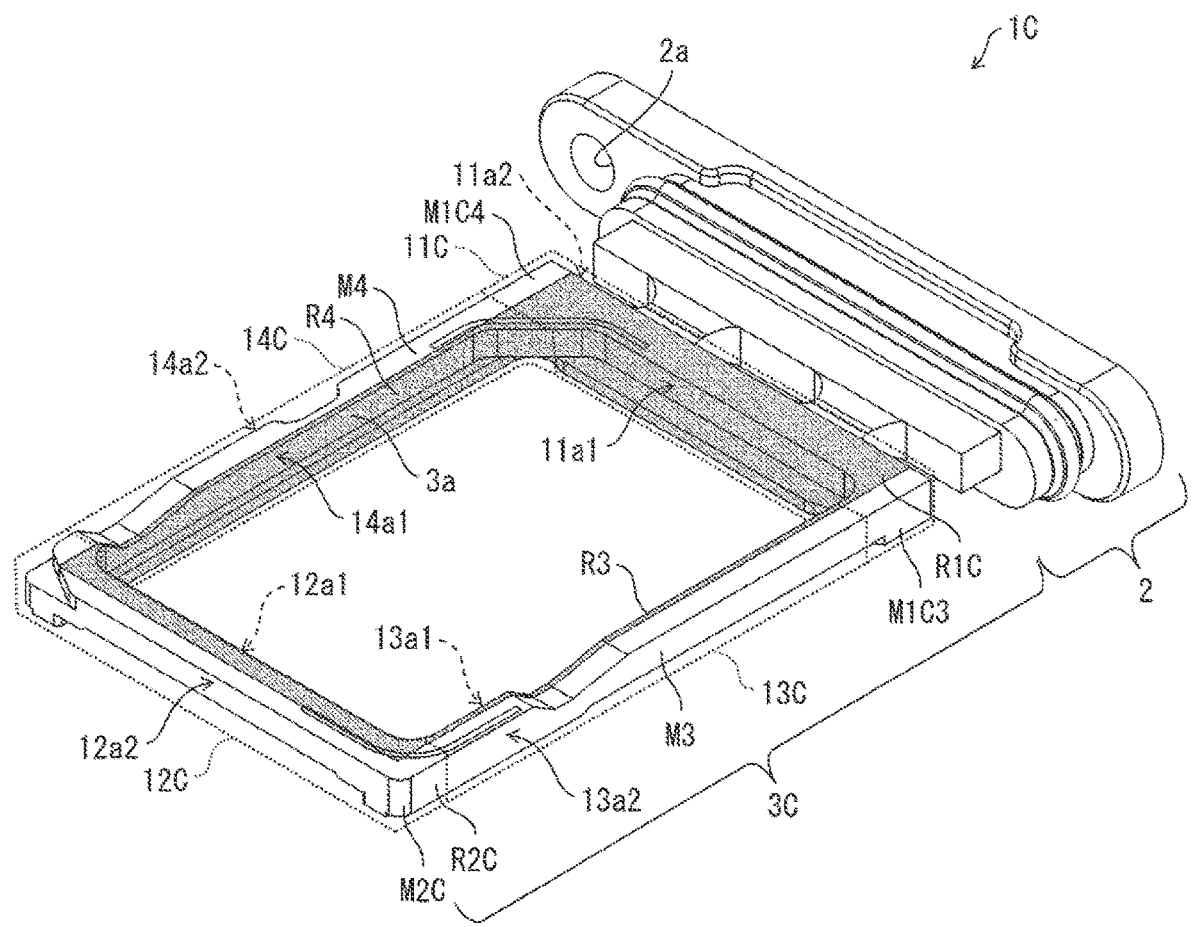
FIG. 7 is a perspective view of a structure of a card tray in accordance with Variation Example 1 of Embodiment 3.

FIG. 7 is a perspective view of a structure of a card tray 1C in accordance with Variation Example 1 of Embodiment 3. The card tray 1C includes a tray body section 3C in place of the tray body section 3 of the card tray 1 (FIG. 4). The tray body section 3C includes a first extension 11C, a second extension 12C, a third extension 13C, and a fourth extension 14C in place of the first extension 11, the second extension 12, the third extension 13, and the fourth extension 14 of the tray body section 3. The card tray 1C has otherwise the same structure as the card tray 1.

The first extension 11C includes a resin extension R1C with opposite ends of the resin extension R1C being interposed between a metal extension M1C3 and a metal extension M1C4. The inner face 11a1 of the first extension 11C is provided by the resin extension R1C, and the outer face 11a2 of the first extension 11C is provided by a combination of the resin extension R1C and the metal extensions M1C3 and M1C4.

The second extension 12C includes a resin extension R2C and a metal extension M2C that is disposed on an outer face and both ends of the resin extension R2C. The second extension 12C has an inner face 12a1 provided by the resin extension R2C. The second extension 12C has an outer face 12a2 provided by the metal extension M2C.

The third extension 13C includes a resin extension R3 and a metal extension M3 that is disposed on an outer face of the resin extension R3. The third extension 13C has an inner face 13a1 provided by the resin extension R3 and an outer face 13a2 provided by the metal extension M3. The fourth extension 14C includes a resin extension R4 and a metal extension M4 that is disposed on an outer face of the resin extension R4. The fourth extension 14C has an inner face 14a1 provided by the resin extension R4 and an outer face 14a2 provided by the metal extension M4.

In other words, the resin extension R1C, the resin extension R2C, the resin extension R3, and the resin extension R4 surround the opening 3a like a frame. The metal extensions M1C3 and M1C4, the metal extension M2C, the metal extension M3, and the metal extension M4 then surround both ends of the resin extension R1C, the outer face and both ends of the resin extension R2C, and the outer faces of the resin extension R3 and the resin extension R4. The resultant tray body section 3C has a higher metal material content, hence higher stiffness, than the tray body section 3B (FIG. 6).

The resin extension R1C, the resin extension R2C, the resin extension R3, and the resin extension R4 are formed integrally. The metal extensions M1C3 and M1C4, the metal extension M2C, the metal extension M3, and the metal extension M4 are also formed integrally. The resin extension R1C, the resin extension R2C, the resin extension R3, and the resin extension R4 may be formed integrally with the metal extensions M1C3 and M1C4, the metal extension M2C, the metal extension M3, and the metal extension M4, for example, by injection molding.

Figure 8:
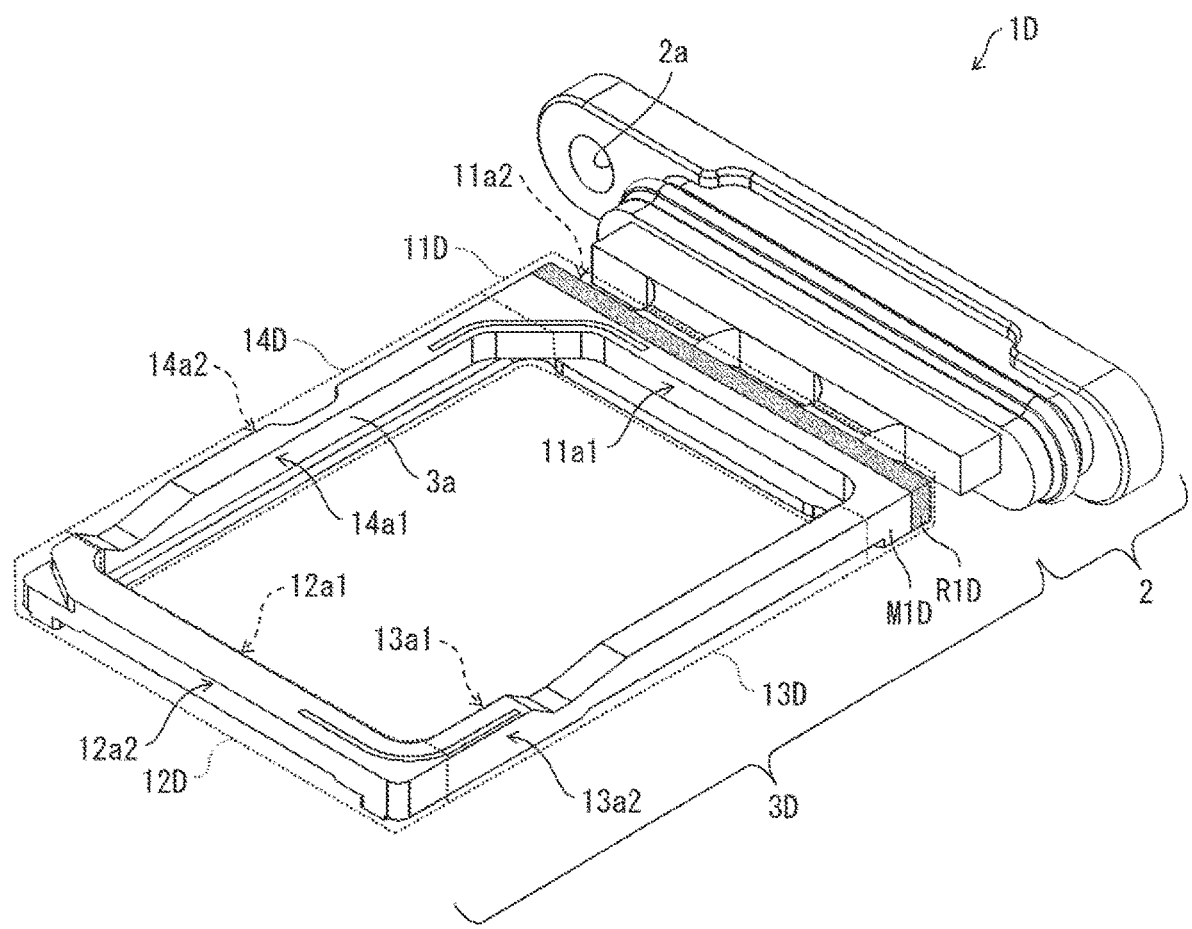
FIG. 8 is a perspective view of a structure of a card tray in accordance with Variation Example 2 of Embodiment 3.

FIG. 8 is a perspective view of a structure of a card tray 1D in accordance with Variation Example 2 of Embodiment 3. The card tray 1D includes a tray body section 3D in place of the tray body section 3 of the card tray 1 (FIG. 4). The tray body section 3D includes a first extension 11D, a second extension 12D, a third extension 13D, and a fourth extension 14D in place of the first extension 11, the second extension 12, the third extension 13, and the fourth extension 14 of the tray body section 3. The card tray 1D has otherwise the same structure as the card tray 1.

The first extension 11D includes a metal extension M1D and a resin extension R1D that is disposed on an outer face of the metal extension M1D. The first extension 11D has an inner face 11a1 provided by the metal extension M1D and an outer face 11a2 provided by the resin extension R1D.

The second extension 12D is entirely composed of a metal material. Both the inner face 12a1 and the outer face 12a2 of the second extension 12D are composed of a metal material. The third extension 13D is entirely composed of a metal material. Both the inner face 13a1 and the outer face 13a2 of the third extension 13D are composed of a metal material. The fourth extension 14D is entirely composed of a metal material. Both the inner face 14a1 and the outer face 14a2 of the fourth extension 14D are composed of a metal material.

The parts of the tray body section 3D that come into contact with the card 20 are composed of a metal material and shaped like a frame as described here. In other words, the metal extension M1D of the first extension 11D, the second extension 12D, the third extension 13D, and the fourth extension 14D surround the opening 3a like a frame. The tray body section 3D thus has metal material portions that are shaped like a frame. The resultant card tray 1D has high stiffness.

In the first extension 11D of the tray body section 3D, the outer face 11a2, which is connected to the lid section 2, is composed of a resin material. The tray body section 3D can therefore easily follow the displacement that may occur in inserting the card tray 1D into the housing 51, thereby better maintaining the water resistance of the housing 51.

The card tray 1D may be formed, for example, by first integrally forming the metal extension M1D of the first extension 11D, the second extension 12D, the third extension 13D, and the fourth extension 14D in a frame shape by cutting or another appropriate process and subsequently placing this frame-shaped metal member in a resin-molding metal die and then pouring a resin material onto the metal member (injection molding). This method enables integral formation of the metal extension M1D of the first extension 11D, the second extension 12D, the third extension 13D, and the fourth extension 14D with the resin extension R1D of the first extension 11D.

Embodiment 4

Figure 9:
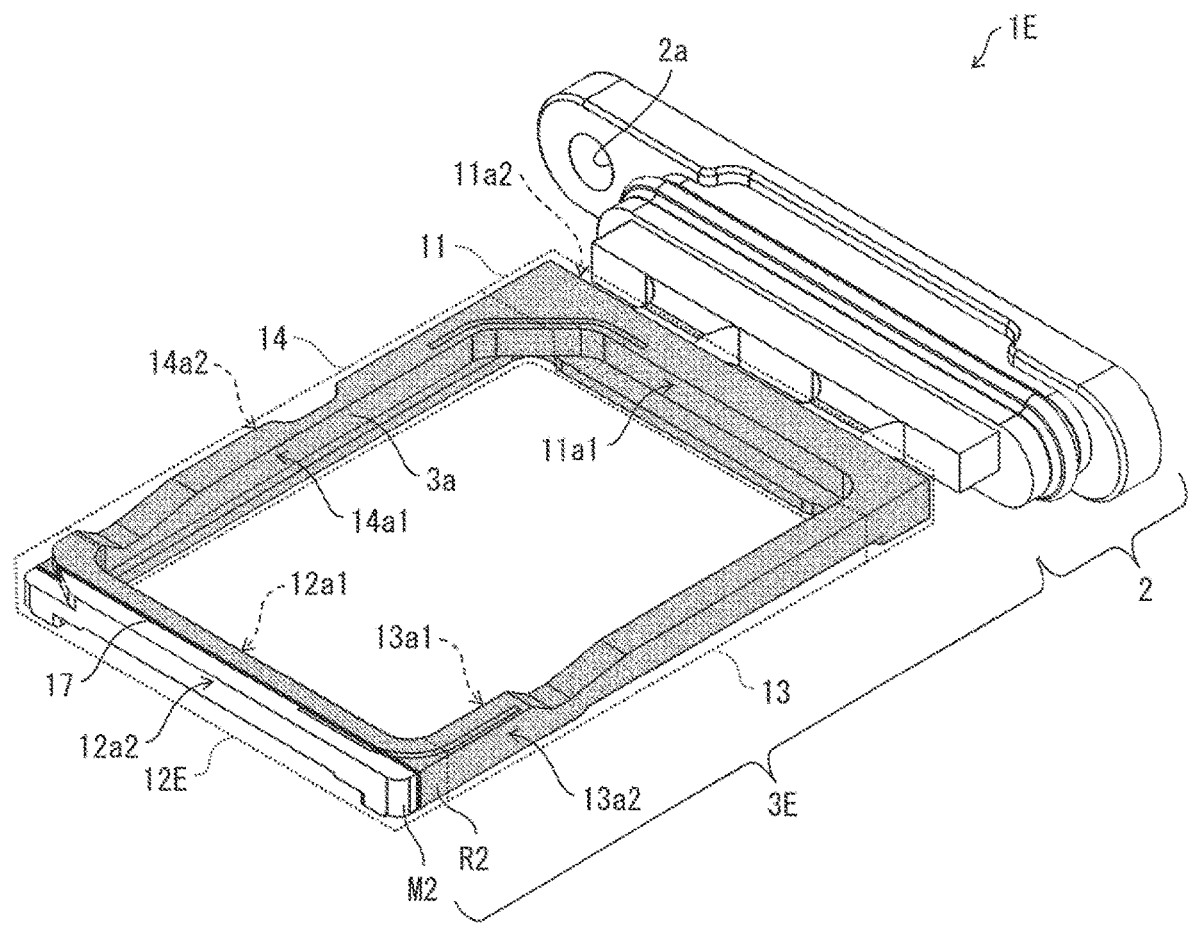
FIG. 9 is a perspective view of a structure of a card tray in accordance with Embodiment 4.

The following will describe Embodiment 4 of the present invention. For convenience of description, members of the present embodiment that have the same function as members shown in drawings for Embodiments 1 to 3 are indicated by the same reference numerals, and description thereof is omitted. FIG. 9 is a perspective view of a structure of a card tray 1E in accordance with Embodiment 4. The card tray 1E includes a tray body section 3E in place of the tray body section 3 of the card tray 1 (FIG. 4). The tray body section 3E includes a second extension 12E in place of the second extension 12 of the tray body section 3. The card tray 1E has otherwise the same structure as the card tray 1.

The second extension 12E includes a resin extension R2 and a metal extension M2 attached together using a double-sided adhesive tape 17. In this manner, the resin extension R2 and the metal extension M2 may be adhered together using the double-sided adhesive tape 17 or an adhesive agent instead of being integrally formed by injection molding.

The resin extension R2A and the metal extension M2A shown in FIG. 5 may also be adhered together using the double-sided adhesive tape 17 or an adhesive agent. The metal extension M1 and the resin extension R1 shown in FIG. 6 may also be adhered together using the double-sided adhesive tape 17 or an adhesive agent. The metal extension M1 may be adhered to the third extension 13 and the fourth extension 14 using the double-sided adhesive tape 17 or an adhesive agent. The resin extension R1C, the resin extension R2C, the resin extension R3, and the resin extension R4 shown in FIG. 7 may also be adhered to the metal extensions M1C3 and M1C4, the metal extension M2C, the metal extension M3, and the metal extension M4 using the double-sided adhesive tape 17 or an adhesive agent. The metal extension M1D of the first extension 11D, the second extension 12D, the third extension 13D, and the fourth extension 14D shown in FIG. 8 may also be adhered to the resin extension R1D of the first extension 11D using the double-sided adhesive tape 17 or an adhesive agent.

The present invention is not limited to the description of the embodiments above and may be altered within the scope of the claims. Embodiments based on a proper combination of technical means disclosed in different embodiments are encompassed in the technical scope of the present invention. Furthermore, a new technological feature can be created by combining different technological means disclosed in the embodiments.

REFERENCE SIGNS LIST 1, 1A to 1E Card Tray
2 Lid Section
2a Through Hole
3, 3A to 3E Tray Body Section
3a Opening
11, 11A to 11D First Extension
11a1 to 14a1 Inner Face
11a2 to 14a2 Outer Face
12, 12A to 12E Second Extension
13, 13C, 13D Third Extension
14, 14C, 14D Fourth Extension
17 Double-sided Adhesive Tape
20 Card
30 Card Cover Slot
31, 51a Insertion Opening
35 Operation Section
35c Bent Portion
36 Eject Lever
50 Electronic Device
51 Housing
52 Substrate
M1 to M4, M1C3, M1C4, M1D, M2A, M2C Metal Extension
R1 to R4, R1C, R1D, R2A, R2C Resin Extension

What is claimed is:

1. A card tray for holding therein a card to be inserted into a housing of an electronic device, the card tray comprising:
   a lid section serving as a flange in inserting the card into the housing; and
   a frame-shaped tray body section into which the card is fitted, the tray body section being connected to the lid section,
   wherein the tray body section includes: a first extension connected to the lid section; and a second extension opposing the first extension, and
   the second extension has at least an outer face thereof being composed of a metal material, the outer face being opposite from an inner face of the second extension where the second extension opposes the first extension; and
   wherein the tray body section has a portion that comes into contact with the card, the portion being composed of the metal material and shaped like a frame.

2. The electronic device, comprising the card tray according to claim 1.

3. A card tray for holding therein a card to be inserted into a housing of an electronic device, the card tray comprising:
   a lid section serving as a flange in inserting the card into the housing; and
   a frame-shaped tray body section into which the card is fitted, the tray body section being connected to the lid section,
   wherein the tray body section includes:
      a first extension connected to the lid section; and a second extension opposing the first extension, and
      the second extension has at least an outer face thereof being composed of a metal material, the outer face being opposite from an inner face of the second extension where the second extension opposes the first extension; and
   wherein the second extension includes a resin extension composed of a resin material and a metal extension composed of the metal material, the resin extension and the metal extension being adjacent to each other.

4. The card tray according to claim 3, wherein the inner face of the second extension is provided by the resin extension, and the outer face of the second extension is provided by the metal extension.

5. The card tray according to claim 3, wherein the resin extension is in contact with the metal extension so that the inner face of the second extension is provided by the resin extension and the metal extension, and the outer face of the second extension is provided by the metal extension.

6. The card tray according to claim 3, wherein the tray body section has a portion that comes into contact with the card, the portion being composed of the resin material and shaped to resemble a frame.

7. The card tray according to claim 3, wherein
   the tray body section further includes a third extension connecting an end of the first extension to an end of the second extension and a fourth extension connecting another end of the first extension to another end of the second extension, and
   the third extension and the fourth extension are composed of the resin material.

8. The card tray according to claim 3, wherein the resin extension and the metal extension are adhered together using an adhesive agent or a double-sided adhesive tape.

* * * * *